US010435763B2

(12) United States Patent
Hammer et al.

(10) Patent No.: US 10,435,763 B2
(45) Date of Patent: Oct. 8, 2019

(54) METHOD FOR PRODUCING A COLD-ROLLED FLAT STEEL PRODUCT WITH HIGH YIELD STRENGTH AND FLAT COLD-ROLLED STEEL PRODUCT

(71) Applicants: ThyssenKrupp Steel Europe AG, Duisburg (DE); JFE Steel Corporation, Tokyo (JP)

(72) Inventors: Brigitte Hammer, Voerde (DE); Frank Hisker, Bottrop (DE); Thomas Heller, Duisburg (DE); Almir Dzafic, Dortmund (DE); Richard G. Thiessen, Malden (NL); Shinjiro Kaneko, Tokyo (JP); Fusae Shiimori, Tokyo (JP)

(73) Assignees: THYSSENKRUPP STEEL EUROPE AG, Duisburg (DE); JFE STEEL CORPORATION, Tokyo (JP)

( * ) Notice: Subject to any disclaimer, the term of this patent is extended or adjusted under 35 U.S.C. 154(b) by 224 days.

(21) Appl. No.: 15/304,268

(22) PCT Filed: Apr. 14, 2015

(86) PCT No.: PCT/EP2015/058101
§ 371 (c)(1),
(2) Date: Oct. 14, 2016

(87) PCT Pub. No.: WO2015/158731
PCT Pub. Date: Oct. 22, 2015

(65) Prior Publication Data
US 2017/0029917 A1     Feb. 2, 2017

(30) Foreign Application Priority Data
Apr. 15, 2014   (DE) .................. 10 2014 105 396

(51) Int. Cl.
| | | |
|---|---|---|
| C21D 9/46 | (2006.01) |
| C21D 1/26 | (2006.01) |
| C21D 8/02 | (2006.01) |
| C22C 38/02 | (2006.01) |
| C22C 38/04 | (2006.01) |
| C22C 38/06 | (2006.01) |
| C22C 38/14 | (2006.01) |
| C22C 38/22 | (2006.01) |
| C22C 38/26 | (2006.01) |
| C22C 38/28 | (2006.01) |
| C22C 38/32 | (2006.01) |
| C22C 38/38 | (2006.01) |
| C23C 2/02 | (2006.01) |
| C23C 2/06 | (2006.01) |
| B32B 15/01 | (2006.01) |
| C22C 38/00 | (2006.01) |
| C23C 2/28 | (2006.01) |
| C23C 2/40 | (2006.01) |
| B22D 11/00 | (2006.01) |

(52) U.S. Cl.
CPC ............. *C21D 9/46* (2013.01); *B22D 11/001* (2013.01); *B32B 15/013* (2013.01); *C21D 1/26* (2013.01); *C21D 8/0226* (2013.01); *C21D 8/0236* (2013.01); *C21D 8/0278* (2013.01); *C22C 38/001* (2013.01); *C22C 38/02* (2013.01); *C22C 38/04* (2013.01); *C22C 38/06* (2013.01); *C22C 38/14* (2013.01); *C22C 38/22* (2013.01); *C22C 38/26* (2013.01); *C22C 38/28* (2013.01); *C22C 38/32* (2013.01); *C22C 38/38* (2013.01); *C23C 2/02* (2013.01); *C23C 2/06* (2013.01); *C23C 2/28* (2013.01); *C23C 2/285* (2013.01); *C23C 2/40* (2013.01); *C21D 8/0273* (2013.01); *C21D 2211/001* (2013.01); *C21D 2211/002* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | |
|---|---|---|
| 9,145,594 B2 | 9/2015 | Toji et al. |
| 9,458,521 B2 * | 10/2016 | Nakagaito ............... C21D 9/46 |
| 9,617,614 B2 * | 4/2017 | Hasegawa ............... C21D 9/46 |
| 2011/0048589 A1 | 3/2011 | Matsuda et al. |
| 2011/0139315 A1 | 6/2011 | Nakagaito et al. |

(Continued)

FOREIGN PATENT DOCUMENTS

| | | |
|---|---|---|
| CN | 102712171 A | 10/2012 |
| CN | 102985578 A | 3/2013 |

(Continued)

*Primary Examiner* — Helene Klemanski
(74) *Attorney, Agent, or Firm* — The Webb Law Firm

(57) ABSTRACT

A method for producing a cold-rolled steel strip with a yield ratio Re/Rm of at least 0.7, the cold-rolled steel product including iron, unavoidable impurities and (in wt. %) C: 0.05-0.20%, Si: 0.25-1.00%, Mn: 1.0-3.0%, Al: 0.02-1.5%, Cr: 0.1-1.5%, N: <0.02%, P: <0.03%, S: <0.05% and optionally one or more of Ti, Mo, Nb, V, and B, Ti: up to 0.15%, Mo: <2%, Nb: <0.1%, V: <0.12%, and B: 0.0005-0.003%. The cold-rolled flat steel product undergoes heat treatment for 4.5-24 hours at a temperature of 150-400° C. Also, a cold rolled flat steel product discussed above having a structure including at least two phases, selected from (in vol. %) at least 10% tempered martensite, <10% bainite, <10% residual austenite and remainder ferrite, a yield ratio of at least 0.7, a tensile strength of ≥750 MPa and a hole expansion of at least 18%.

10 Claims, 1 Drawing Sheet

(56) References Cited

U.S. PATENT DOCUMENTS

| | | |
|---|---|---|
| 2012/0288733 A1 | 11/2012 | Ennis et al. |
| 2013/0209831 A1 | 8/2013 | Becker et al. |
| 2014/0041767 A1 | 2/2014 | Hammer et al. |
| 2014/0182748 A1 | 7/2014 | Nakagaito et al. |
| 2015/0000797 A1 | 1/2015 | Sebald et al. |
| 2015/0044504 A1 | 2/2015 | Ennis et al. |
| 2015/0267280 A1 | 9/2015 | Jun et al. |
| 2015/0337408 A1 | 11/2015 | Schulz et al. |
| 2018/0030564 A1* | 2/2018 | Hasegawa ............... C22C 38/14 |

FOREIGN PATENT DOCUMENTS

| | | |
|---|---|---|
| CN | 103146992 A | 6/2013 |
| DE | 102012013113 A1 | 12/2013 |
| EP | 2258886 A1 | 12/2010 |
| EP | 2551359 A1 | 1/2013 |
| JP | 2009203550 A | 9/2009 |
| JP | 2010138444 A | 6/2010 |
| JP | 2011140687 A | 7/2011 |
| WO | 2011076383 A1 | 6/2011 |
| WO | 2012110165 A1 | 8/2012 |
| WO | 2013082171 A1 | 6/2013 |
| WO | 2014009404 A1 | 1/2014 |
| WO | WO 2016/113788 A1 * | 7/2016 |

\* cited by examiner ns national phase of PCT/EP2015/058101 filed 
METHOD FOR PRODUCING A COLD-ROLLED FLAT STEEL PRODUCT WITH HIGH YIELD STRENGTH AND FLAT COLD-ROLLED STEEL PRODUCT

CROSS-REFERENCE TO RELATED APPLICATIONS

This application is the United States national phase of International Application No. PCT/EP2015/058101 filed Apr. 14, 2015, and claims priority to German Patent Application No. 10 2014 105 396.6 filed Apr. 15, 2014, the disclosures of which are hereby incorporated in their entirety by reference.

BACKGROUND OF THE INVENTION

Field of the Invention

The invention concerns a method for producing a cold-rolled steel strip with an optimised yield ratio Re/Fm and a correspondingly obtained cold-rolled flat steel product.

Description of Related Art

Flat steel products of the kind involved here are rolled products obtained by cold rolling such as steel strips or sheets, and blanks and plates made from these.

Unless expressly indicated to the contrary all particulars of content of the steel compositions indicated in this application refer to weight. All indications in "%" not specified in more detail in relation to a steel alloy must therefore be understood to be in "wt. %".

Details of structural constituents in each case refer to percent by volume ("vol.-%"), unless expressly indicated to the contrary.

High-strength flat steel products are becoming increasingly important, in particular in the area of commercial vehicle construction, because they allow a reduction in the vehicle's own weight and an increase in the useful load.

A lower weight contributes not only to optimal utilisation of the technical performance of the respective drive unit, but aids resource efficiency, cost optimisation and climate protection.

A significant reduction in the unladen weight of sheet steel constructions can be achieved by an increase in the mechanical properties, in particular the strength of the flat steel product used in each case.

Apart from high strength, however, modern flat steel products intended for commercial vehicle construction are also expected to be tough and have good brittle facture resistance behaviour and optimum suitability for cold working and welding.

There have been a large number of trials aimed at meeting these requirements through alloying or process engineering. A common feature of these trials is that they were based on a so-called two or multiphase steel, the structure of which in each case comprised at least two dominant phases, wherein for multi-phase steels lower contents of other phases may be present.

Thus for example from WO 2013/082171 A1 a flat steel product comprising a two-phase steel, with a ferritic-martensitic structure is known. The flat steel product comprises a steel containing 0.5-3.5 wt. % Si, 0.1-0.3 wt. % C, 1-3 wt. % Mn, and in each case optionally 0.05-1 wt. % Al, a total of 0.005-0.1 of one or more of the elements Nb, Ti und V and up to 0.3 wt. % Mo, and as a result has a tensile strength of at least 980 MPa and an elongation of at least 15%. The flat steel product is produced in an in itself known manner by hot and cold-rolling. After cold-rolling it undergoes heat treatment, in which it is initially annealed at a temperature of 775-825° C., then it is quenched before undergoing ageing treatment at 200-420° C. for a period of 150 seconds.

From DE 10 2012 013 113 A1 a cold-rolled flat steel product is also known, comprising a high-strength, multi-phase steel with minimum tensile strengths of 580 MPa, containing 0.075-0.105 wt. % C, 0.6-0.8 wt. % Si, 1.0-2.25 wt. % Mn, 0.28-0.48 wt. % Cr, 0.01-0.6 wt. % Al, up to 0.02 wt. % P, up to 0.01 wt. % N, up to 0.015 wt. % S and as the remainder iron and unavoidable impurities. During the process, following cold-rolling, the flat steel product undergoes heat treatment comprising a complete temperature cycle. Thus the strip is initially heated to a target temperature of 700-950° C., and then cooled at a cooling rate of 10-100° C./s to an intermediate temperature of 300-500° C., then again at a cooling rate of 15-100° C./s to a second intermediate temperature of 200-250° C. and finally at a cooling rate of 2-30° C./s to ambient temperature. Through this measure an optimised structure and associated optimised mechanical properties are to be arrived at.

EP 2 551 359 A1 discloses a method for manufacturing an ultrahigh strength member having a tensile strength of 1180 MPa or more and showing an excellent delayed fracture resistance. To achieve this, a steel sheet is heated at a first heating temperature of 700-1000° C., formed into a shape of a member at the first heating temperature and simultaneously cooled. After completion of the cooling, the obtained member is shear punched into a desired shape to obtain an ultrahigh strength member. Then the ultrahigh strength member is subjected to first heat treatment including heating and retaining the member held at a second heating temperature of 100 to less than 300° C. for 1 second to 60 minutes.

According to US 2011/0048589 A1 an ultra-high strength steel sheet can be obtained on the basis of a steel which comprises 0.12-0.50 wt.-% C, up to 2.0 wt.-% Si, 1.0-5.0 wt.-% Mn, up to 0,1 wt.-% P up to 0.07 wt.-% S, up to 1.0 wt.-% Al, up to 0.008 wt.-% N, balance Fe and incidental impurities. The steel's micro-structure includes, on an area ratio basis, 80% or more of autotempered martensite, less than 5% of ferrite, 10% or less of bainite, and 5% or less of retained austenite. To adjust the autotempered martensite fraction in the microstructure the steel sheet passes after cold rolling an annealing treatment in the course of which it is annealed for 15-600 seconds in a first temperature range which lower limit is defined by the Ac3 transformation temperature of the respective steel and which upper limit is set to 1000° C. Specifically, the temperature of the annealing is adjusted such that the micro structure of the steel exclusively consists of austenite. The annealed cold rolled steel sheet is then cooled with a cooling rate of 3° C./s or higher to a temperature range ranging from 780° C. to the Ac3-temperature. After that temperature range is reached the steel sheet is cooled to 550° C. When this temperature is passed the cold-rolled steel sheet is subjected to an autotempering treatment in the course of which the steel sheet is cooled down to a temperature range of 150-300° C. with a cooling rate of 0.01-10° C./s.

SUMMARY OF THE INVENTION

Against the background of the state of the art as set out above, the object of the invention was to provide a method for producing a flat steel product with a high yield ratio Re/Rm, which is operationally safe to perform and which in the process leads to an optimum combination of properties of the flat steel product obtained. Here "Re" denotes the yield strength and "Rm" the tensile strength of the respective flat steel product.

Equally, a correspondingly created flat steel product should be provided.

DESCRIPTION OF THE INVENTION

Figure 1A:
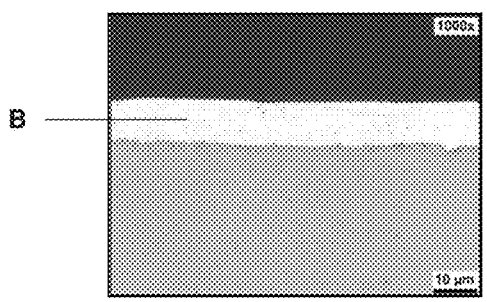
FIG. 1A is a cross-sectional micrograph of the steel sheet produced in trial 2 before the long-time annealing treatment.

Accordingly, with the method according to the invention for producing a cold-rolled steel strip with a yield ratio Re/Rm of at least 0.7, a cold-rolled flat steel product is provided in a steel comprising iron, unavoidable production impurities and (in wt. %) C: 0.05-0.20%, Si: 0.25-1.00%, Mn: 1.0-3.0%, Al: 0.02-1.5%, Cr: 0.1-1.5%, N: less than 0.02%, P: less than 0.03%, S: less than 0.05% and optionally one or more elements from the group "Ti, Mo, Nb, VB" subject to Ti: being up to 0.15%, Mo: less than 2%, Nb: less than 0.1%, V: less than 0.12%, and B: 0.0005-0.003%.

According to the invention the cold-rolled flat steel product produced now undergoes additional heat treatment, in which over an annealing time of 4.5-24 hours it is annealed at an annealing temperature of up to 150-400° C.

In the course of the additionally performed long-time annealing according to the invention the martensite present is tempered.

It has surprisingly transpired that as a result of the long-time annealing carried out at comparatively low temperatures according to the invention a dramatic increase in the yield strength Re and an improvement in the hole expansion LA occurs, in other words the properties which are particularly important for the processing of flat steel products according to the invention in automotive body construction. The mechanical properties of flat steel products indicated here in general and in relation to the embodiments presented below are in each case from transverse specimen according to DIN EN ISO 6892-1:2009 (specimen shape 2). The hole expansion LA according to ISO 16630 is determined to assess how easy it is to bend an edge under or its susceptibility to cracking. In addition, as a measure of the formability during bending the bending angle according to VDA 238-100, 2010 can also be determined.

Numerous trials have shown here that as a result of the after-treatment according to the invention an improvement in the yield strength Re of at least 40 MPa compared with the state prior to the long-time annealing according to the invention can be achieved, wherein regular improvements of at least 200 MPa were achieved. The hole expansion LA is improved by the after-treatment according to the invention by at least 4% in absolute terms compared with the initial state, wherein here an increase of 10% or more in absolute terms was regularly achieved.

In practice the long-time annealing additionally performed according to the invention following completion of the normal work steps undertaken in the production of cold-rolled flat steel products is performed as bell-type annealing.

The steel alloy which the flat steel products to be produced according to the invention comprise, is selected in such a way that under the effect of the additional long-time annealing optimum mechanical properties are achieved.

C is present in the steel of a cold-rolled flat steel product used according to the invention in contents of 0.05-0.20 wt. %, in order to produce martensite of sufficient hardness. At higher C contents too little ferrite occurs. If, on the other hand, the C content is below 0.05 wt. %, the desired strength is not obtained. Optimum use can be made of the effect of C if the C content is at least 0.07 wt. % or a maximum of 0.16 wt. %.

Si is present in the steel of a cold-rolled flat steel product used according to the invention in contents of 0.25-1.00 wt. %, in order to increase the strength through mixed crystal hardening. Si contents of above 1.00 wt. %, can impair the surface quality, for example as a result of adherence of scale or inter-granular oxidation. In order to reliably exclude this, the Si content can be restricted to a maximum of 0.75 wt. %. If on the other hand the Si content is too low, then the strength-increasing effect is insufficient. If it is particularly important for the desired effect of Si to be present, then the Si content can be set at a minimum of 0.30 wt. %.

Mn is present in the steel of a cold-rolled flat steel product used according to the invention in contents of 1.0-3.0 wt. %, in order to aid martensite formation. This effect can be used particularly reliably if the Mn content is at least 1.5 wt. % or a maximum of 2.6 wt. %.

Al is present in the steel of a cold-rolled flat steel product used according to the invention in contents of 0.02-1.5 wt. %, in order on the one hand to deoxidise during melting and on the other to ensure a sufficient amount of ferrite and thus increase the elongation. Contents of 0.025-0.7 wt. % have proven favourable in this regard.

Cr is present in the steel of a cold-rolled flat steel product used according to the invention in contents of 0.1-1.5 wt. %, similarly in order to increase the strength. If the Cr contents are too low then this effect cannot be used. If the Cr contents are too high, however, then there is a danger of inter-granular oxidation and poorer elongation properties. In order to be able to make particularly reliable use of the positive effects of Cr, the Cr content can be set at a minimum of 0.1 wt. % or a maximum of 0.7 wt. %.

N is an undesired alloy constituent, which can be attributed to the unavoidable impurities. Therefore its content in the steel of a cold-rolled flat steel product used according to the invention may be a maximum of 0.02 wt. %. Optimally it is limited to a maximum of 0.008 wt. %.

P and S are similarly undesired alloy constituents, which can be attributed to the unavoidable impurities. Therefore the P content must be set at less than 0.03 wt. % and the S content at less than 0.05 wt. %.

In order to set certain properties the steel of a cold-rolled flat steel product used according to the invention, optionally one or more elements from the group "Ti, Mo, Nb, V, Cu, Ni, B" can be added. For the contents of these not essential but merely optionally present elements the following applies:

Ti can be added to the steel of a cold-rolled flat steel product used according to the invention in contents of up to 0.15 wt. %, in order through TiN and TiC formation to contribute to the grain refinement and increase in strength. A further effect in the presence of boron is to remove N, so that no boron nitrides are formed.

Mo can be present in the steel of a cold-rolled flat steel product used according to the invention in contents of less than 2 wt. %, in order to increase the strength by promoting martensite formation.

Contents of Nb of less than 0.1 wt. % contribute to grain refinement and an increase in strength through carbide formation.

V can be present in the steel of a cold-rolled flat steel product used according to the invention in contents of less than 0.12 wt. %, in order to increase the strength by making hardening easier and/or through VC formation.

B in contents of 0.0005-0.003 wt. % contributes to the increase in hardness.

Flat steel products produced and obtained according to the invention have a structure which after the additional heat treatment comprises at least two phases, of which martensite and ferrite are the dominant two, wherein at least 10 vol.-% of tempered martensite, less than 10 vol.-% bainite, less than 10 vol.-% residual austenite and in each case ferrite as the remainder are present. The structure of the flat steel product should contain at least 10 vol.-% ferrite here, in order to be able to set the necessary elongation. In the structure of the flat steel product according to the invention at least 10 vol.-% martensite should also be present, in order firstly to achieve the strength and secondly to have a tempering effect.

The cold-rolled flat steel products provided for performing the method according to the invention can be produced based on a steel with the composition explained above in ways that are in themselves known. For this purpose, in the production of the flat steel product provided the following work steps can be performed:

a) casting a steel with the composition discussed above into a slab;
b) reheating the slab to a reheating temperature of 1,200-1,300° C.;
c) hot-rolling the reheated slab into a hot-rolled strip, wherein the hot-rolling temperature of the hot-rolled strip upon completion of the hot rolling is 800-970° C.;
d) coiling the hot-rolled strip at a coiling temperature of 450-650° C.;
e) cold-rolling the hot-rolled strip in one or more cold-rolling steps into a cold-rolled flat steel product, wherein the cold-rolling grade achieved by the cold-rolling is in total 25-80%;
f) continuous annealing of the cold-rolled flat steel product at a continuous annealing temperature of 700-900° C.;
g) cooling of the flat steel product to ambient temperature.

Optionally, the flat steel product provided for the additional heat treatment can be provided with a metallic protective coating. This is for example appropriate if from the flat steel product components are made which in practical use are exposed to a corrosive environment. The metallic coating can be applied in any suitable manner, wherein here in particular application by hot-dip galvanising is suitable. Here the annealing treatment (work step f) can similarly be performed in an in itself known manner in the course of the pre-treatment necessary for the hot-dip galvanising. Where desired, the hot-dip galvanising can also be followed by a further galvannealing treatment.

According to the explanations given here a flat steel product according to the invention comprises a steel containing (in wt. %) C: 0.05-0.20%, Si: 0.25-1.00%, Mn: 1.0-3.0%, Al: 0.02-1.5%, Cr: 0.1-1.5%, N: less than 0.02%, P: less than 0.03%, S: less than 0.05% and optionally one or more elements from the group "Ti, Mo, Nb, V, B" subject to Ti: being up to 0.15%, Mo: less than 2%, Nb: less than 0.1%, V: less than 0.12%, B: 0.0005-0.003%, and as the remainder iron and unavoidable impurities, wherein the structure of the flat steel product has at least two phases, formed of (in vol.-%) at least 10% tempered martensite, less than 10 vol.-% bainite, less than 10 Vol.-% residual austenite and as the remainder ferrite, and wherein the flat steel product has a yield ratio Re/Rm of at least 0.7, a tensile strength Rm of more than 750 MPa and a hole expansion LA as a result of the heat treatment according to the invention of at least 4%.

The yield ratio Re/Rm of a cold-rolled flat steel product produced according to the invention reaches values of at least 0.7, whereas the yield ratios Re/Rm in the initial state, i.e. prior to the heat treatment according to the invention are lower. The tensile strengths Rm here are regularly between 770-1,270 MPa. The drop in elongation of a steel that has undergone heat treatment according to the invention compared with a non-heat-treated steel is a maximum of 4% and a minimum of 1%. The increase in hole expansion LA of a cold-rolled flat steel product produced and obtained according to the invention compared with that of non-heat-treated steels is typically at least 4%, wherein increases in the hole expansion LA of up to 30% are achieved. The increase in the bending angle achieved by the heat treatment according to the invention can typically reach up to 20°.

As a result of the heat treatment according to the invention a metallic coating present on the flat steel product is altered.

In the following the invention is explained in more detail using embodiments.

To test the invention six steel melts A-F were melted, the composition of which is given in Table 1.

The steel melts A-F were cast into slabs for trials 1-10.

The slabs cast from the steel melts A-F were reheated to a reheating temperature BT and then in a conventional manner at a hot-rolling temperature WET in each case hot-rolled into a hot-rolled strip with thicknesses of 2-4 mm.

The hot-rolled strips obtained were cooled to a coiling temperature HT and at this temperature HT in each case coiled into a coil.

Following cooling the hot-rolled strips were cold-rolled in a similarly conventional manner with a total cold-rolling grade KWG achieved through the cold rolling into cold-rolled steel strips. The total cold-rolling grade KWG achieved through the cold-rolling is determined here in the generally normal manner according to the formula KWG=100% *(dV−dN)/dV, wherein dV is the thickness of the hot-rolled strip prior to cold-rolling and dN is the thickness of the cold-rolled strip obtained after cold rolling.

Then the cold-rolled steel strips underwent continuous annealing treatment at an annealing temperature TG. During trials 2, 3, 5, 6, 9 and 10 the cold-rolled steel strips were then cooled to a bath entry temperature TUE, at which they were, in the continuous process following on from the annealing treatment, introduced into a Zn molten bath. Upon leaving the molten bath the cold-rolled steel strips in trials 2, 5, 6 and 9 coated in this way with a Zn-based corrosion protection coating then, in the ongoing continuous process, underwent a galvannealing treatment.

In trials 1, 4, 7 and 8 the cold-rolled steel strips used there in each case were on the other hand cooled to an ageing temperature TUE and following the ageing period cooled to ambient temperature.

From the cold-rolled steel strips obtained in the manner described above in each case in the transverse direction the yield strength Re, the tensile strength Rm and the elongation A80 were determined. Similarly the hole expansion LA was investigated. In addition, from the cold-rolled steel strips obtained in trials 2, 3, 5, 6 and 7 the bending angle BW according to VDA 238-100 was determined.

The reheating temperatures BT, hot-rolling temperatures WET, coiling temperatures HT, total cold-rolling grade KWG, annealing temperatures TG, and ageing temperature TUE, set in trials 1-10, the type of surface (see column "SB_ART"->"U"=uncoated; "Z"=hot-dip galvanised only; "ZF"=hot-dip galvanised with subsequent galvannealing treatment) and the yield strengths Re and tensile strengths Pin, determined from the cold-rolled strips obtained, the yield ratio Re/Rm given by the respective yield strength Re and tensile strength Rm, elongations A8O and hole expansions LA as well as the bending angle BW, are shown in Table 2 "Production conditions and properties prior to long-time annealing".

Each of the cold-rolled steel strips obtained in the above manner in the trials then underwent an additional long-time annealing carried out as batch annealing, during which it was maintained for a period t_LZ at a temperature T_LZ.

Following the long-time annealing, for the now additionally long-time annealed, cold-rolled steel strips obtained, the structural components and in turn the yield strength Re_LZ, the tensile strength Rm_LZ, the elongation A80_LZ (in each case in the transverse direction) and the hole expansion LA_LZ were determined. Similarly for cold-rolled and long-time-annealed steel strips obtained in trials 2, 3, 5 and 6 the bending angle BW was measured.

Table 3 gives for trials 1-10 the respective period t_LZ and the respective maximum temperature T_LZ of the long-time annealing, the proportions of tempered martensite and ferrite in the structure, the remaining structural components ("RA"=residual austenite, "B"=bainite) making up the "REMAINDER" of the structure, as well as the yield strengths Re_LZ, the tensile strengths Rm_LZ, the yield ratio (Re/Rm)_LZm made up of the respective yield strength Re_LZ and the respective tensile strength Rm_LZ, the elongations A80_LZ (in each case in the transverse direction), the hole expansions LA_LZ, the bending angle BW_LZ, the increase ΔRe brought about by the long-time annealing in the yield strength (ΔRe=Re_Lz−Re) and the increase ΔLA in the hole expansion brought about by the long-time annealing (ΔLA=LA_Lz−LA) of the cold-rolled strips obtained following long-time annealing.

It can be seen that without exception as a result of the additional long-time annealing carried out according to the invention a significant increase ΔRe in the yield strength Re was achieved (ΔRe=115-360 MPa). The hole expansion LA also saw similarly significant improvement (ΔLA=4-30%). The elongation A80_LZ and the tensile strength Rm_LZ have in comparison with respect to the state prior to the long-time annealing fallen comparatively little.

With this combination of properties the cold-rolled steel strips are optimally suited for the production of components having a high strength and simultaneously good deformability and crash behaviour in the event of an accident.

Figure 1B:
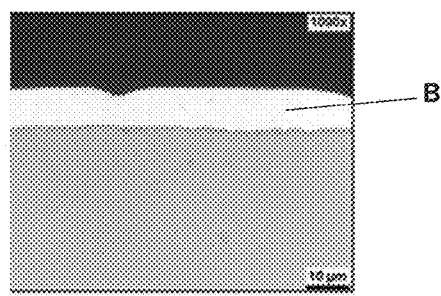
FIG. 1B is a cross-sectional micrograph of the steel sheet produced in trial 2 after the long-time annealing treatment.
Figure 2A:
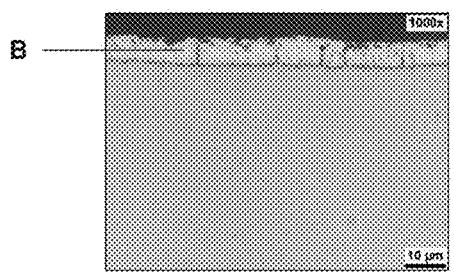
FIG. 2A is a cross-sectional micrograph of the steel sheet produced in trial 3 before the long-time annealing treatment.
Figure 2B:
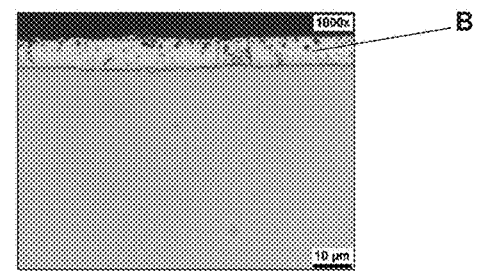
FIG. 2B is a cross-sectional micrograph of the steel sheet produced in trial 3 after the long-time annealing treatment.

FIG. 1 shows the micrographs for the steel sheet produced in trial 2 and FIG. 2 the micrographs for the steel sheet produced in trial 3, from which the condition before (FIGS. 1(a) and 2(a)) and after the respective long-time annealing treatment (FIGS. 1(b) and 2(b)) are shown. It can be seen that the coating B is not affected by the heat treatment.

TABLE 1

| Steel | C | Si | Mn | Al | Cr | N | Ti | Mo | Nb | B |
|---|---|---|---|---|---|---|---|---|---|---|
| A | 0.08 | 0.6 | 1.7 | 0.036 | 0.33 | 0.005 | 0.12 | — | — | — |
| B | 0.14 | 0.3 | 1.5 | 0.028 | 0.11 | 0.003 | — | 0.23 | — | — |
| C | 0.16 | 0.7 | 1.9 | 0.028 | 0.30 | 0.004 | 0.12 | — | — | — |
| D | 0.16 | 0.3 | 1.8 | 0.028 | 0.42 | 0.004 | 0.04 | — | — | 0.0010 |
| E | 0.07 | 0.3 | 2.6 | 0.029 | 0.66 | 0.005 | 0.07 | 0.09 | — | 0.0013 |
| F | 0.16 | 0.4 | 2.3 | 0.65 | 0.69 | 0.003 | 0.03 | — | 0.03 | 0.0011 |

All particulars in wt. %, remainder iron und unavoidable impurities

TABLE 2

| No. | Steel | BT [° C.] | WET [° C.] | HT [° C.] | KWG [%] | TG [° C.] | TUE [° C.] | SB TYPE | Re [MPa] | Rm [MPa] | Re/Rm | A8O [%] | LA [%] | BW [°] |
|---|---|---|---|---|---|---|---|---|---|---|---|---|---|---|
| 1 | A | 1255 | 910 | 525 | 59 | 845 | 470 | U | 670 | 870 | 0.77 | 8.9 | 20 | — |
| 2 | B | 1250 | 895 | 575 | 70 | 825 | — | ZF | 465 | 790 | 0.59 | 19.6 | 15 | 90 |
| 3 | B | 1250 | 890 | 570 | 50 | 830 | — | Z | 470 | 810 | 0.58 | 19.8 | 15 | 85 |
| 4 | c | 1240 | 915 | 520 | 37 | 855 | 420 | U | 665 | 1000 | 0.67 | 14.9 | 16 | — |
| 5 | D | 1260 | 915 | 510 | 50 | 855 | — | ZF | 670 | 1060 | 0.63 | 15 | 17 | 80 |
| 6 | D | 1260 | 920 | 520 | 45 | 860 | — | ZF | 680 | 1065 | 0.64 | 15.4 | 16 | 75 |
| 7 | E | 1255 | 945 | 600 | 40 | 560 | 460 | U | 730 | 1000 | 0.73 | 12.8 | 39 | 107 |
| 8 | F | 1250 | 890 | 540 | 47 | 835 | 460 | U | 765 | 1240 | 0.62 | 11.5 | 14 | — |
| 9 | F | 1240 | 880 | 550 | 56 | 840 | — | ZF | 700 | 1220 | 0.57 | 10.3 | 17 | — |
| 10 | F | 1265 | 910 | 550 | 40 | 850 | — | Z | 805 | 1265 | 0.64 | 11.9 | 11 | — |

Production conditions and properties prior to long-time annealing

TABLE 3

| | | Bell-type annealing | | Structure in vol.-% | | | | | | | | | |
|---|---|---|---|---|---|---|---|---|---|---|---|---|---|
| No. | Steel | T_LZ [° C.] | t_LZ [h] | Ferrite | Tempered martensite | Remainder | Re_LZ [MPa] | Rm_LZ [MPa] | (Re/Rm)_LZ | LA_LZ [%] | BW_LZ [°] | ΔRe [MPa] | ΔLA [%] |
| 1 | A | 320 | 15 | 70 | 30 | — | 855 | 885 | 0.97 | 24 | | 185 | 4 |
| 2 | B | 300 | 7 | 65 | 30 | RA | 580 | 780 | 0.74 | 35 | 110 | 115 | 20 |

TABLE 3-continued

Production conditions and properties following long-time annealing

| No. | Steel | Bell-type annealing | | Structure in vol.-% | | | Re_LZ [MPa] | Rm_LZ [MPa] | (Re/Rm)_LZ | LA_LZ [%] | BW_LZ [°] | ΔRe [MPa] | ΔLA [%] |
| --- | --- | --- | --- | --- | --- | --- | --- | --- | --- | --- | --- | --- | --- |
| | | T_LZ [° C.] | t_LZ [h] | Ferrite | Tempered martensite | Remainder | | | | | | | |
| 3 | B | 250 | 16 | 65 | 30 | RA | 620 | 775 | 0.80 | 37 | 104 | 150 | 22 |
| 4 | c | 320 | 15 | 55 | 40 | RA | 850 | 960 | 0.89 | 24 | | 185 | 8 |
| 5 | D | 400 | 6 | 65 | 30 | RA | 855 | 995 | 0.86 | 47 | 100 | 185 | 30 |
| 6 | D | 260 | 16 | 55 | 40 | RA | 860 | 1035 | 0.83 | 40 | 98 | 180 | 24 |
| 7 | E | 350 | 10 | 50 | 50 | — | 955 | 1020 | 0.94 | 48 | | 225 | 9 |
| 8 | F | 210 | 15 | 35 | 60 | B/RA | 970 | 1210 | 0.80 | 25 | | 205 | 11 |
| 9 | F | 160 | 14 | 25 | 70 | B/RA | 1060 | 1190 | 0.99 | 29 | | 360 | 12 |
| 10 | F | 250 | 14 | 25 | 73 | B/RA | 1020 | 1225 | 0.83 | 21 | | 215 | 10 |

The invention claimed is:

1. A method for producing a cold-rolled steel strip comprising: providing a cold-rolled flat steel product comprising iron, unavoidable production impurities and (in wt. %) C:0.05-0.20%, Si:0.25-1.00%, Mn:1.0-3.0%, Al:0.02-1.5%, Cr:0.1-1.5%, N: less than 0.02%, P: less than 0.03%, S: less than 0.05% and optionally one or more elements from the group Ti, Mo, Nb, V, and B subject to Ti: being up to 0.15%, Mo: less than 2%, Nb: less than 0.1%, V: less than 0.12%, and B:0.0005-0.003%, wherein the cold-rolled flat steel product provided undergoes heat treatment, during which it is annealed for an annealing time of 4.5-24 hours at an annealing temperature of up to 150-400° C. and, after the heat treatment, the cold-rolled flat steel product has a yield ratio Re/Rm of at least 0.7.

2. The method according to claim 1, wherein the annealing time is 6-18 hours.

3. The method according to claim 1, wherein the cold-rolled flat steel product obtained after the heat treatment has a structure comprising at least two phases selected from at least 10 vol.-% tempered martensite, less than 10 vol.-% bainite, less than 10 vol.-% residual austenite and as the remainder ferrite.

4. The method according to claim 3, wherein the structure of the flat steel product contains at least 10 vol.-% ferrite.

5. The method according to claim 3, wherein the structure of the flat steel product contains at least 10 vol.-% tempered martensite.

6. The method according to claim 1,
further comprising; before the heat treatment,
a) casting steel into a slab;
b) reheating the slab to a reheating temperature of 1,200-1,300 ° C.;
c) hot-rolling the reheated slab into a hot-rolled strip, wherein the hot-rolling temperature of the hot-rolled strip upon completion of the hot-rolling is 800-970 ° C.;
d) coiling the hot-rolled strip at a coiling temperature of 450-650 ° C.;
e) cold-rolling the hot-rolled strip in one or more cold-rolling steps to form the cold-rolled flat steel product, wherein the cold-rolling grade achieved by the cold-rolling is in total 25-80%;
f) continuous annealing of the cold-rolled flat steel product at a continuous annealing temperature of 700-900° C.;
g) cooling of the flat steel product to ambient temperature.

7. The method according to claim 1,
wherein the cold-rolled flat steel product provided for the heat treatment is provided with a metallic protective coating.

8. The method according to claim 7, wherein the metallic protective coating is applied by hot-dip galvanising of the cold-rolled flat steel product.

9. The method according to claim 8, wherein the cold-rolled flat steel product prior to the heat treatment undergoes a galvannealing treatment.

10. A cold-rolled flat steel product,
comprising (in wt. %) C: 0.05-0.20%, Si:0.25-1.00%, Mn:1.0-3.0%, Al:0.02-1,5%, Cr:0.1-1.5%, N: less than 0.02%, P: less than 0.03%, S: less than 0.05% and optionally one or more elements from the group Ti, Mo, Nb, V, and B subject to Ti: being up to 0.15%, Mo: less than 2%, Nb: less than 0.1%, V:, and B:0.0005-0.003%, and as the remainder iron and unavoidable impurities,
having a structure comprising at least two phases selected from (in vol.-%) at least 10% tempered martensite, less than 10 vol.-% bainite, less than 10 vol.-% residual austenite and as the remainder ferrite,
and
having a yield ratio Re/Rm of at least 0.7, a tensile strength Rm of more than 750 MPa and a hole expansion LA of at least 18%.

* * * * *

UNITED STATES PATENT AND TRADEMARK OFFICE
CERTIFICATE OF CORRECTION

PATENT NO. : 10,435,763 B2
APPLICATION NO. : 15/304268
DATED : October 8, 2019
INVENTOR(S) : Brigitte Hammer et al.

Page 1 of 1

It is certified that error appears in the above-identified patent and that said Letters Patent is hereby corrected as shown below:

In the Claims

Column 10, Line 38, Claim 10 delete "1,5%," and insert -- 1.5%, --

Signed and Sealed this
Twenty-fourth Day of December, 2019

Andrei Iancu
*Director of the United States Patent and Trademark Office*